United States Patent
Chandler et al.

(10) Patent No.: US 12,308,479 B2
(45) Date of Patent: *May 20, 2025

(54) BATTERY PARTS HAVING SOLVENTLESS ACID BARRIERS AND ASSOCIATED SYSTEMS AND METHODS

(71) Applicant: Otter Lake Technologies, LLC, White Bear Township, MN (US)

(72) Inventors: Christophe Chandler, Woodbury, MN (US); Carl Dubois, Glenwood City, WI (US); Kurt T. Gifford, Lino Lakes, MN (US)

(73) Assignee: Otter Lake Technologies, LLC, White Bear Township, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/473,630

(22) Filed: Sep. 25, 2023

(65) Prior Publication Data

US 2024/0128615 A1    Apr. 18, 2024

Related U.S. Application Data

(60) Continuation of application No. 17/669,247, filed on Feb. 10, 2022, now Pat. No. 11,804,640, which is a
(Continued)

(51) Int. Cl.
*H01M 50/571* (2021.01)
*H01M 50/562* (2021.01)
*H01M 50/172* (2021.01)

(52) U.S. Cl.
CPC ....... *H01M 50/571* (2021.01); *H01M 50/562* (2021.01); *H01M 50/172* (2021.01)

(58) Field of Classification Search
CPC . H01M 50/571; H01M 50/562; H01M 50/172
See application file for complete search history.

(56) References Cited

U.S. PATENT DOCUMENTS

| 1,248,768 A | 12/1917 | Willard |
| 1,326,936 A | 1/1920 | Allan et al. |
(Continued)

FOREIGN PATENT DOCUMENTS

| CA | 645083 A | 7/1962 |
| CA | 2103759 A1 | 3/1994 |
(Continued)

OTHER PUBLICATIONS

JPS62139245 MT (Year: 1987).*
(Continued)

*Primary Examiner* — Alexander Usyatinsky
(74) *Attorney, Agent, or Firm* — Fredrikson & Byron, P.A.

(57) ABSTRACT

Battery parts, such as battery terminals, and associated systems and methods for making the same are disclosed herein. In some embodiments, a battery part includes a body having a base portion and a lug portion extending from the base portion. The battery part can further include a light-curable sealing material at least partially covering an exterior surface of the base portion. The sealing material is configured to seal an interface between the battery part and the material of a battery container when the base portion is embedded in the battery container material.

20 Claims, 3 Drawing Sheets

Related U.S. Application Data division of application No. 16/562,770, filed on Sep. 6, 2019, now Pat. No. 11,283,141.

(60) Provisional application No. 62/776,977, filed on Dec. 7, 2018.

(56) References Cited

U.S. PATENT DOCUMENTS

| | | |
|---|---|---|
| 1,411,414 A | 4/1922 | Cook |
| 1,947,158 A | 2/1934 | Henry |
| 1,982,801 A | 12/1934 | Gerking |
| 1,983,618 A | 12/1934 | Lamond |
| 2,100,333 A | 11/1937 | Hess |
| 2,194,092 A | 3/1940 | Lund |
| 2,500,556 A | 3/1950 | Mallach |
| 2,510,100 A | 6/1950 | Goss |
| 2,599,706 A | 6/1952 | Friedman |
| 2,678,960 A | 5/1954 | Jensen |
| 2,901,527 A | 8/1959 | Mocas |
| 3,096,579 A | 7/1963 | Waller |
| 3,101,534 A | 8/1963 | Lange |
| 3,113,892 A | 12/1963 | Albrecht |
| 3,186,209 A | 6/1965 | Friedman |
| 3,280,613 A | 10/1966 | Schrom |
| 3,292,218 A | 12/1966 | Kozma, Jr. |
| 3,344,848 A | 10/1967 | Hall et al. |
| 3,381,515 A | 5/1968 | Orloff |
| 3,534,802 A | 10/1970 | Carr |
| 3,554,272 A | 1/1971 | Lauth |
| 3,709,459 A | 1/1973 | Bushrod |
| 3,736,642 A | 6/1973 | Miller et al. |
| 3,744,112 A | 7/1973 | Lindenberg et al. |
| 3,793,086 A | 2/1974 | Badger |
| 3,808,663 A | 5/1974 | Mclane |
| 3,835,686 A | 9/1974 | Lawson et al. |
| 3,842,646 A | 10/1974 | Kuhn |
| 3,847,118 A | 11/1974 | Ambry |
| 3,945,097 A | 3/1976 | Daniels, Jr. et al. |
| 3,945,428 A | 3/1976 | Yanagisawa et al. |
| 3,947,936 A | 4/1976 | Wheadon |
| 3,992,759 A | 11/1976 | Farmer |
| 4,034,793 A | 7/1977 | Okura et al. |
| 4,041,755 A | 8/1977 | Rut |
| 4,049,040 A | 9/1977 | Lynch |
| 4,062,613 A | 12/1977 | Tritenne |
| 4,079,911 A | 3/1978 | Wirtz et al. |
| 4,083,478 A | 4/1978 | Mclane |
| 4,100,674 A | 7/1978 | Tiegel |
| 4,146,771 A | 3/1979 | Tiegel |
| 4,160,309 A | 7/1979 | Scholle |
| 4,168,618 A | 9/1979 | Saier et al. |
| 4,177,551 A | 12/1979 | Johnson et al. |
| 4,212,934 A | 7/1980 | Salamon |
| 4,257,250 A | 3/1981 | Vanderhorst et al. |
| 4,266,597 A | 5/1981 | Eberle |
| 4,284,122 A | 8/1981 | Oxenreider et al. |
| 4,291,568 A | 9/1981 | Stifano, Jr. |
| 4,296,546 A | 10/1981 | Hill et al. |
| 4,352,283 A | 10/1982 | Bailey |
| 4,362,043 A | 12/1982 | Hanson |
| 4,377,197 A | 3/1983 | Oxenreider et al. |
| 4,394,059 A | 7/1983 | Reynolds |
| 4,406,146 A | 9/1983 | Suzuki |
| 4,416,141 A | 11/1983 | Nippert |
| 4,422,236 A | 12/1983 | Ware, Jr. et al. |
| 4,423,617 A | 1/1984 | Nippert |
| 4,430,396 A | 2/1984 | Hayes, Jr. |
| 4,469,720 A | 9/1984 | Morris |
| 4,480,393 A | 11/1984 | Flink et al. |
| 4,495,260 A | 1/1985 | Hardigg et al. |
| 4,497,359 A | 2/1985 | Suzuki et al. |
| 4,500,221 A | 2/1985 | Emerson |
| 4,502,213 A | 3/1985 | Madden et al. |
| 4,505,307 A | 3/1985 | Uchida |
| 4,574,005 A | 3/1986 | Cobbs, Jr. et al. |
| 4,580,431 A | 4/1986 | Oku et al. |
| 4,592,405 A | 6/1986 | Allen |
| 4,600,608 A | 7/1986 | Ankrett |
| 4,610,581 A | 9/1986 | Heinlein |
| 4,614,630 A | 9/1986 | Pluim, Jr. |
| 4,662,205 A | 5/1987 | Ratte |
| 4,683,647 A | 8/1987 | Brecht et al. |
| 4,744,540 A | 5/1988 | Salamon et al. |
| 4,753,283 A | 6/1988 | Nakano |
| 4,775,604 A | 10/1988 | Dougherty et al. |
| 4,776,197 A | 10/1988 | Scott |
| 4,779,443 A | 10/1988 | Hoshi |
| 4,779,665 A | 10/1988 | Ouimet |
| 4,835,711 A | 5/1989 | Hutchins et al. |
| 4,852,634 A | 8/1989 | Kawai et al. |
| 4,859,216 A | 8/1989 | Fritsch |
| 4,859,547 A | 8/1989 | Adams et al. |
| 4,874,032 A | 10/1989 | Hatamura |
| 4,879,191 A | 11/1989 | Sindorf |
| 4,938,276 A | 7/1990 | Noguchi et al. |
| 4,945,749 A | 8/1990 | Walker et al. |
| 4,967,827 A | 11/1990 | Campbell |
| 4,998,206 A | 3/1991 | Jones et al. |
| 5,016,460 A | 5/1991 | England et al. |
| 5,048,590 A | 9/1991 | Carter |
| 5,072,772 A | 12/1991 | Haehne |
| 5,074,352 A | 12/1991 | Suzuki |
| 5,077,892 A | 1/1992 | Nugent |
| 5,079,967 A | 1/1992 | Lacava |
| 5,108,668 A | 4/1992 | Kallup |
| 5,125,450 A | 6/1992 | Kidd et al. |
| 5,143,141 A | 9/1992 | Frulla |
| 5,146,974 A | 9/1992 | Mayer et al. |
| 5,170,835 A | 12/1992 | Eberle et al. |
| 5,180,643 A | 1/1993 | Nedbal |
| 5,244,033 A | 9/1993 | Ueno |
| 5,273,845 A | 12/1993 | Mchenry et al. |
| 5,290,646 A | 3/1994 | Asao et al. |
| 5,296,317 A | 3/1994 | Ratte et al. |
| 5,316,505 A | 5/1994 | Kipp |
| 5,326,655 A | 7/1994 | Mix et al. |
| 5,343,927 A | 9/1994 | Ivansson |
| 5,349,840 A | 9/1994 | Ratte et al. |
| 5,373,720 A | 12/1994 | Ratte et al. |
| 5,380,603 A | 1/1995 | Hooke |
| 5,415,219 A | 5/1995 | Wiedenmann et al. |
| 5,422,202 A | 6/1995 | Spiegelberg et al. |
| 5,445,907 A | 8/1995 | Ito et al. |
| 5,458,032 A | 10/1995 | Spiegelberg |
| 5,499,449 A | 3/1996 | Carter et al. |
| 5,511,605 A | 4/1996 | Iwamoto |
| 5,532,173 A | 7/1996 | Martin et al. |
| 5,580,685 A | 12/1996 | Schenk |
| 5,584,730 A | 12/1996 | Tabata |
| 5,595,511 A | 1/1997 | Okada |
| 5,606,887 A | 3/1997 | Spiegelberg et al. |
| 5,623,984 A | 4/1997 | Nozaki et al. |
| 5,655,400 A | 8/1997 | Spiegelberg et al. |
| 5,660,946 A | 8/1997 | Kump et al. |
| 5,663,015 A | 9/1997 | Hooke et al. |
| 5,671,797 A | 9/1997 | Nozaki et al. |
| 5,672,442 A | 9/1997 | Burnett |
| 5,686,202 A | 11/1997 | Hooke et al. |
| 5,704,119 A | 1/1998 | Ratte et al. |
| 5,709,967 A | 1/1998 | Larsen |
| 5,725,043 A | 3/1998 | Schaefer et al. |
| 5,730,203 A | 3/1998 | Mogensen |
| 5,746,267 A | 5/1998 | Yun et al. |
| 5,752,562 A | 5/1998 | Sparks |
| 5,758,711 A | 6/1998 | Ratte |
| 5,778,962 A | 7/1998 | Garza-Ondarza et al. |
| 5,785,110 A | 7/1998 | Guergov |
| 5,791,183 A | 8/1998 | Spiegelberg et al. |
| 5,814,421 A | 9/1998 | Spiegelberg et al. |
| 5,836,372 A | 11/1998 | Kono |
| 5,862,853 A | 1/1999 | Eliat |
| 5,887,641 A | 3/1999 | Iwamoto et al. |
| 5,908,065 A | 6/1999 | Chadwick |
| 5,924,471 A | 7/1999 | Lund et al. |

(56) References Cited

U.S. PATENT DOCUMENTS

| | | |
|---|---|---|
| 5,971,663 A | 10/1999 | Brothers |
| 6,001,506 A | 12/1999 | Timmons et al. |
| 6,030,723 A | 2/2000 | Nagano et al. |
| 6,033,801 A | 3/2000 | Casais |
| 6,082,937 A | 7/2000 | Ratte |
| 6,123,142 A | 9/2000 | Ratte |
| 6,146,789 A | 11/2000 | Horie et al. |
| 6,152,785 A | 11/2000 | Haller et al. |
| 6,155,889 A | 12/2000 | Scarla et al. |
| 6,183,905 B1 | 2/2001 | Ling |
| 6,202,733 B1 | 3/2001 | Ratte |
| 6,255,617 B1 | 7/2001 | Farmer et al. |
| 6,258,481 B1 | 7/2001 | Ross et al. |
| 6,267,171 B1 | 7/2001 | Onuki et al. |
| 6,363,996 B1 | 4/2002 | Ratte |
| 6,405,786 B1 | 6/2002 | Ratte |
| 6,499,530 B2 | 12/2002 | Ratte |
| 6,506,448 B1 | 1/2003 | Minogue |
| 6,513,570 B2 | 2/2003 | Ratte |
| 6,564,853 B1 | 5/2003 | Ratte |
| 6,581,792 B1 | 6/2003 | Limanjaya |
| 6,598,658 B2 | 7/2003 | Ratte |
| 6,613,163 B1 | 9/2003 | Pfeifenbring et al. |
| 6,644,084 B1 | 11/2003 | Spiegelberg |
| 6,684,084 B1 | 1/2004 | Phillips |
| 6,684,935 B2 | 2/2004 | Ratte |
| 6,701,998 B2 | 3/2004 | Ratte |
| 6,803,146 B2 | 10/2004 | Key et al. |
| 6,806,000 B2 | 10/2004 | Misra et al. |
| 6,830,490 B2 | 12/2004 | Murakami et al. |
| 6,864,015 B2 | 3/2005 | Peterson et al. |
| 6,866,087 B2 | 3/2005 | Ratte |
| 6,896,031 B2 | 5/2005 | Ratte |
| 6,902,095 B2 | 6/2005 | Ratte et al. |
| 6,908,640 B2 | 6/2005 | Ratte et al. |
| 6,929,051 B2 | 8/2005 | Peterson et al. |
| 6,982,131 B1 | 1/2006 | Hamada et al. |
| 6,997,234 B2 | 2/2006 | Peterson |
| 7,021,101 B2 | 4/2006 | Spiegelberg |
| 7,029,589 B2 | 4/2006 | Mcginness |
| 7,070,441 B1 | 7/2006 | Gregory et al. |
| 7,074,516 B2 | 7/2006 | Davidson et al. |
| 7,163,763 B2 | 1/2007 | Spiegelberg et al. |
| 7,163,764 B2 | 1/2007 | Ratte |
| 7,338,539 B2 | 3/2008 | Ratte et al. |
| 7,390,364 B2 | 6/2008 | Ratte et al. |
| 7,838,145 B2 | 11/2010 | Ratte et al. |
| 8,061,404 B2 | 11/2011 | Neal et al. |
| 8,181,691 B1 | 5/2012 | Neal et al. |
| 8,202,328 B2 | 6/2012 | Ratte et al. |
| 8,497,036 B2 | 7/2013 | Garin et al. |
| 8,512,891 B2 | 8/2013 | Ratte |
| 8,701,743 B2 | 4/2014 | Ratte et al. |
| 8,802,282 B2 | 8/2014 | Garin et al. |
| 9,034,508 B2 | 5/2015 | Ratte |
| 9,190,654 B2 | 11/2015 | Ratte et al. |
| 9,748,551 B2 | 8/2017 | Cain et al. |
| 9,917,293 B2 | 3/2018 | Garin et al. |
| 9,935,306 B2 | 4/2018 | Garin et al. |
| 9,954,214 B2 | 4/2018 | Cain |
| 10,181,595 B2 | 1/2019 | Cain et al. |
| 10,217,987 B2 | 2/2019 | Cain |
| 10,283,754 B2 | 5/2019 | Ratte et al. |
| 10,910,625 B2 | 2/2021 | Garin et al. |
| 11,038,156 B2 | 6/2021 | Chandler et al. |
| 2001/0031394 A1 | 10/2001 | Hansen et al. |
| 2002/0002772 A1 | 1/2002 | Hirano et al. |
| 2002/0114994 A1 | 8/2002 | Yabuki et al. |
| 2003/0017391 A1 | 1/2003 | Peterson et al. |
| 2003/0017392 A1 | 1/2003 | Key et al. |
| 2003/0207172 A1 | 11/2003 | Misra et al. |
| 2003/0224248 A1 | 12/2003 | Spiegelberg et al. |
| 2005/0015573 A1 | 1/2005 | Campi et al. |
| 2005/0042509 A1 | 2/2005 | Key et al. |
| 2005/0084751 A1 | 4/2005 | Ratte |
| 2005/0147881 A1 | 7/2005 | Ratte et al. |
| 2005/0147882 A1 | 7/2005 | Ratte et al. |
| 2005/0153202 A1 | 7/2005 | Ratte et al. |
| 2005/0155737 A1* | 7/2005 | Ratte ................. H01M 4/00 164/113 |
| 2005/0238955 A1 | 10/2005 | Hooke et al. |
| 2006/0068279 A1 | 3/2006 | Spiegelberg et al. |
| 2006/0127693 A1 | 6/2006 | Peslerbe et al. |
| 2006/0162417 A1 | 7/2006 | Spiegelberg et al. |
| 2006/0255002 A1 | 11/2006 | Takamatsu et al. |
| 2008/0038633 A1 | 2/2008 | Ratte et al. |
| 2008/0263855 A1* | 10/2008 | Li ................. H01M 10/0436 29/623.5 |
| 2009/0047574 A1 | 2/2009 | Hellmann |
| 2009/0130553 A1 | 5/2009 | Nakamura et al. |
| 2009/0191456 A1* | 7/2009 | Yamamoto .......... H01M 50/131 29/623.5 |
| 2009/0229781 A1 | 9/2009 | Ratte |
| 2009/0246618 A1 | 10/2009 | Dirks |
| 2010/0116455 A1 | 5/2010 | Ratte et al. |
| 2010/0291435 A1* | 11/2010 | Garin ................. H01M 50/186 29/623.1 |
| 2011/0045336 A1 | 2/2011 | Ratte et al. |
| 2011/0174459 A1 | 7/2011 | Garin et al. |
| 2011/0250475 A1 | 10/2011 | Yamamoto et al. |
| 2011/0250493 A1 | 10/2011 | Balzan et al. |
| 2011/0262806 A1* | 10/2011 | Balzan ................. H01M 50/184 429/211 |
| 2013/0280569 A1 | 10/2013 | Mori et al. |
| 2014/0083642 A1 | 3/2014 | Ratte |
| 2014/0201981 A1 | 7/2014 | Ratte et al. |
| 2014/0259646 A1 | 9/2014 | Cain |
| 2014/0322594 A1* | 10/2014 | Garin ................. H01M 50/553 429/182 |
| 2016/0126527 A1 | 5/2016 | Ratte et al. |
| 2016/0197317 A1* | 7/2016 | Dittel .................. H01M 50/119 429/179 |
| 2017/0256774 A1 | 9/2017 | Iwasaki et al. |
| 2018/0241025 A1 | 8/2018 | Garin et al. |
| 2020/0243832 A1 | 7/2020 | Chandler et al. |

FOREIGN PATENT DOCUMENTS

| | | |
|---|---|---|
| CA | 2459031 A1 | 3/1994 |
| CA | 2558525 A1 | 4/2007 |
| CH | 321596 A | 5/1957 |
| CH | 371154 A | 8/1963 |
| CN | 104064819 B | 9/2014 |
| CN | 104577057 A | 4/2015 |
| DE | 134330 C | 7/1880 |
| DE | 523104 C | 4/1931 |
| DE | 1146149 B | 3/1963 |
| DE | 2645977 A1 | 4/1978 |
| DE | 3132292 A1 | 3/1983 |
| DE | 3230628 C1 | 12/1983 |
| DE | 3401354 A1 | 7/1985 |
| DE | 3502675 A1 | 7/1986 |
| DE | 3942175 A1 | 6/1991 |
| DE | 4127956 A1 | 2/1993 |
| DE | 4206439 A1 | 9/1993 |
| DE | 4241393 C2 | 7/1994 |
| DE | 19635075 A1 | 3/1998 |
| EP | 40951 A1 | 12/1981 |
| EP | 117213 A1 | 8/1984 |
| EP | 244683 A1 | 11/1987 |
| EP | 261311 A1 | 3/1988 |
| EP | 284068 A1 | 9/1988 |
| EP | 319128 A1 | 6/1989 |
| EP | 344042 A1 | 11/1989 |
| EP | 448792 A2 | 10/1991 |
| EP | 559920 A1 | 9/1993 |
| EP | 590284 A2 | 4/1994 |
| EP | 601268 A1 | 6/1994 |
| EP | 633081 A1 | 1/1995 |
| EP | 809327 A2 | 11/1997 |
| EP | 836237 A1 | 4/1998 |
| EP | 878856 A1 | 11/1998 |
| EP | 941554 A1 | 9/1999 |

(56) References Cited

FOREIGN PATENT DOCUMENTS

| | | | |
|---|---|---|---|
| EP | 1291940 A2 | 3/2003 | |
| EP | 1700354 A2 | 9/2006 | |
| ES | 2097388 T3 | 4/1997 | |
| FR | 2504424 A1 | 10/1982 | |
| GB | 297904 A | 10/1928 | |
| GB | 386159 A | 1/1933 | |
| GB | 801628 A | 9/1958 | |
| GB | 1236495 A | 6/1971 | |
| GB | 1245255 A | 9/1971 | |
| GB | 1257963 A | 12/1971 | |
| GB | 1352882 A | 5/1974 | |
| GB | 2141654 A | 1/1985 | |
| GB | 2315695 A | 2/1998 | |
| JP | 54144931 U | 10/1979 | |
| JP | 55057259 A | 4/1980 | |
| JP | S56159054 U | 12/1981 | |
| JP | S56165359 U | 12/1981 | |
| JP | 58209861 A | 12/1983 | |
| JP | 59029357 A | 2/1984 | |
| JP | 61008846 A | 1/1986 | |
| JP | 61096660 A | 5/1986 | |
| JP | 61189860 A | 8/1986 | |
| JP | 62139245 A * | 6/1987 | ............. H01M 2/06 |
| JP | S62139245 A | 6/1987 | |
| JP | 1239762 A | 9/1989 | |
| JP | 1243369 A | 9/1989 | |
| JP | 2155557 A | 6/1990 | |
| JP | 2247036 A | 10/1990 | |
| JP | 3049152 U | 3/1991 | |
| JP | 3263756 B2 | 11/1991 | |
| JP | 4135042 B2 | 5/1992 | |
| JP | 4206459 A | 7/1992 | |
| JP | 4223047 A | 8/1992 | |
| JP | H06340849 A | 12/1994 | |
| JP | 9045309 A | 5/1997 | |
| JP | 9130460 A | 5/1997 | |
| JP | 9167610 A | 6/1997 | |
| JP | 9237615 A | 9/1997 | |
| JP | 9312151 A | 12/1997 | |
| JP | 9320630 A | 12/1997 | |
| JP | 10116602 A | 5/1998 | |
| JP | 10144289 A | 5/1998 | |
| JP | 8171897 A | 7/1998 | |
| JP | 10208714 A | 8/1998 | |
| JP | 8273656 A | 10/1998 | |
| JP | 11024954 A | 1/1999 | |
| JP | 11045698 A | 2/1999 | |
| JP | 11045699 A | 2/1999 | |
| JP | 11135102 A | 5/1999 | |
| JP | 11176415 A | 7/1999 | |
| JP | 2000021367 A | 1/2000 | |
| JP | 2000164199 A | 6/2000 | |
| JP | 2001006655 A | 1/2001 | |
| JP | 2001256955 A | 9/2001 | |
| JP | 2001307714 A | 11/2001 | |
| JP | 2002025536 A | 1/2002 | |
| JP | 2002050327 A | 2/2002 | |
| JP | 2002175795 A | 6/2002 | |
| JP | 2002270150 A | 9/2002 | |
| JP | 2003007281 A | 1/2003 | |
| JP | 2003242946 A | 8/2003 | |
| JP | 3929032 B2 | 10/2003 | |
| JP | 2003317677 A | 11/2003 | |
| JP | 2003317698 A | 11/2003 | |
| JP | 2003346777 A | 12/2003 | |
| JP | 2003346778 A | 12/2003 | |
| JP | 2004039401 A | 2/2004 | |
| JP | 2004228013 A | 8/2004 | |
| JP | 2004228046 A | 8/2004 | |
| JP | 2004235050 A | 8/2004 | |
| JP | 2004281145 A | 10/2004 | |
| JP | 2005078856 A | 3/2005 | |
| JP | 4839570 B2 | 4/2005 | |
| JP | 2005116243 A | 4/2005 | |
| JP | 2005116387 A | 4/2005 | |
| JP | 2005142009 A | 6/2005 | |
| JP | 2006331784 A | 12/2006 | |
| JP | 2007157611 A | 6/2007 | |
| JP | 5283057 B2 | 9/2013 | |
| JP | 5325940 B2 | 10/2013 | |
| JP | 6015402 B2 | 10/2016 | |
| JP | 6020663 B2 | 11/2016 | |
| JP | 6196136 B2 | 9/2017 | |
| JP | 6223812 B2 | 11/2017 | |
| JP | 2018129162 A | 8/2018 | |
| JP | 7211308 B2 | 1/2023 | |
| JP | 7211309 B2 | 1/2023 | |
| JP | 7235286 B2 | 3/2023 | |
| KR | 1020030044813 A | 6/2003 | |
| KR | 2011044954 A | 5/2011 | |
| KR | 2015075656 A | 7/2015 | |
| KR | 2015089458 A | 8/2015 | |
| KR | 2015089463 A1 | 8/2015 | |
| SU | 688279 A1 | 9/1979 | |
| WO | 8800099 A1 | 1/1988 | |
| WO | 9402272 A1 | 2/1994 | |
| WO | 9907029 A1 | 2/1999 | |
| WO | 2005067513 A2 | 7/2005 | |
| WO | 2005119813 A2 | 12/2005 | |
| WO | 2008032348 A1 | 3/2008 | |
| WO | 2009142621 A1 | 11/2009 | |
| WO | 2010033239 A1 | 3/2010 | |
| WO | 2010127289 A1 | 11/2010 | |

OTHER PUBLICATIONS

Dymax SpeedMask Masking Resins to be Showcased at MRO Europe by Dymax Corporation (DYMAX). (Year: 2017).*
Dymax, "Dyrnax SpeedMask Masking Resins to be showcased at MRO Europe," Article [online] Aug. 28, 2017 [retrieved Nov. 6, 2019] from https://news.thomasnet.corn/companystory/dymax speedmask-masking-resins-to-be-showcased-at-mro-europe-40006419>; 2 pages.
U.S. International Search Authority, International Search Report and Written Opinion dated Jan. 30, 2020 for PCT/US19/49886, filed Sep. 6, 2019, 12 pages.
International Bureau, International Preliminary Report on Patentability mailed Jun. 17, 2021 for PCT/US2019/049886, filed Sep. 6, 2019, 9 Pages.
European Search Report for Application No. 19892297.3 mailed Nov. 18, 2022, 10 Pages.
JPS62139245MT (Year: 1986).

* cited by examiner

BATTERY PARTS HAVING SOLVENTLESS ACID BARRIERS AND ASSOCIATED SYSTEMS AND METHODS

CROSS-REFERENCE TO RELATED APPLICATIONS

This application is a continuation of U.S. patent application Ser. No. 17/669,247, filed on Feb. 10, 2022, titled "BATTERY PARTS HAVING SOLVENTLESS ACID BARRIERS AND ASSOCIATED SYSTEMS AND METHODS," which is a division of U.S. patent application Ser. No. 16/562,770 (now U.S. Pat. No. 11,283,141), filed on Sep. 6, 2019, titled "BATTERY PARTS HAVING SOLVENTLESS ACID BARRIERS AND ASSOCIATED SYSTEMS AND METHODS," which claims priority to U.S. Provisional Patent Application No. 62/776,977, filed on Dec. 7, 2018, titled "BATTERY PARTS HAVING SOLVENTLESS ACID BARRIERS AND ASSOCIATED SYSTEMS AND METHODS," each of which is incorporated herein by reference in its entirety.

TECHNICAL FIELD

The following disclosure relates generally to battery parts and, more particularly, to battery terminals, battery terminal bushings, and the like having solventless acid barriers.

BACKGROUND

Battery terminals are typically cold formed or die cast from lead or lead alloys. In a conventional battery, the terminals protrude from a casing or container which carries an electrolyte, such as sulfuric acid. The container is typically formed from a moldable thermoplastic resin, such as polypropylene. During manufacture of the container, the resin flows around the base of the terminals so that the resin will secure the terminals in place once it hardens. After a terminal has been secured, a lead anode can be inserted into a central hole in the terminal and melted to fill the hole and form a mechanical and electrical connection to a battery grid positioned within the container.

The different coefficients of thermal expansion between the battery container and the lead terminals can cause these materials to separate at their interface as a result of thermal cycling. The battery terminals may also become loose in the container wall if subjected to repeated or excessive twisting or torsional loads. These factors can cause small cracks to form between the terminals and the container wall, and electrolyte can readily pass through these cracks due to the low surface tension of electrolytes. Accordingly, it can be important to establish a good seal between the lead terminals and the container to avoid migration of the electrolyte (e.g., sulfuric acid) out of the battery container and/or ingress of gases (e.g., oxygen) into the battery container.

Typically, a sealant such as polyisobutylene is provided between the lead terminals and the battery container to seal the interface therebetween. However, conventional sealants must be dissolved in a solvent (to form, e.g., a solution including polyisobutylene) before being applied to the battery terminals. The commercial solvents that are capable of dissolving such sealants include hydrocarbon-based or chlorinated solvents. Such solvents, however, are intrinsically toxic, extremely flammable, air pollutants, and/or volatile organic compounds. For example, trichloroethylene (TCE) is commonly used to dissolve sealants including polyisobutylene, yet TCE is classified as a hazardous air pollutant (HAP) compound in the United States, and the use of TCE is severely restricted and being phased out in the European Union and China.

As disclosed in U.S. Pat. No. 5,709,967, D-limonene—a naturally occurring product extracted from citrus fruit peels—has been proposed as a substitute for TCE. (U.S. Pat. No. 5,709,967 is incorporated herein by reference in its entirety.) However, the flammability and slow evaporation of D-limonene has greatly limited its commercial applicability.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology.

DETAILED DESCRIPTION

The following disclosure describes various embodiments of battery parts, such as battery terminals, bushings, and the like that are at least partially coated with sealant, and associated assemblies and methods of manufacture and use. In some embodiments, a battery part configured in accordance with the present disclosure includes a body having a base portion that is configured to be embedded in battery container material when the battery container is formed. The base portion can have a sealant applied to an external surface thereof. The sealant is configured to provide a seal or barrier between the battery container material and the battery part. As described in greater detail below, in some embodiments, the sealant is a non-toxic, light-curable resin. As discussed above, many existing sealants require the use of solvents that are hazardous to humans and/or the environment. In contrast, the battery parts of the present technology do not require the use of hazardous solvents while still effectively sealing the interface between the battery parts and the battery container material in which they are embedded.

Certain details are set forth in the following description and in FIGS. 1-3 to provide a thorough understanding of various embodiments of the disclosure. Other details describing well-known structures and systems often associated with battery parts (e.g., lead and/or lead alloy battery parts, moldable battery containers, etc.), and methods for forming such parts (e.g., forming, casting, injection molding, etc.), as well as other battery parts and assemblies, are not set forth in the following disclosure to avoid unnecessarily obscuring the description of the various embodiments of the present technology. Moreover, many of the details and features shown in the Figures are merely illustrative of particular embodiments of the present technology. Accordingly, other embodiments can have other details and features without departing from the spirit and scope of the present technology. In addition, the various elements and features illustrated in the Figures may not be drawn to scale. Furthermore, various embodiments of the present technology can include structures other than those illustrated in the Figures and are expressly not limited to the structures shown in the Figures.

Figure 1:
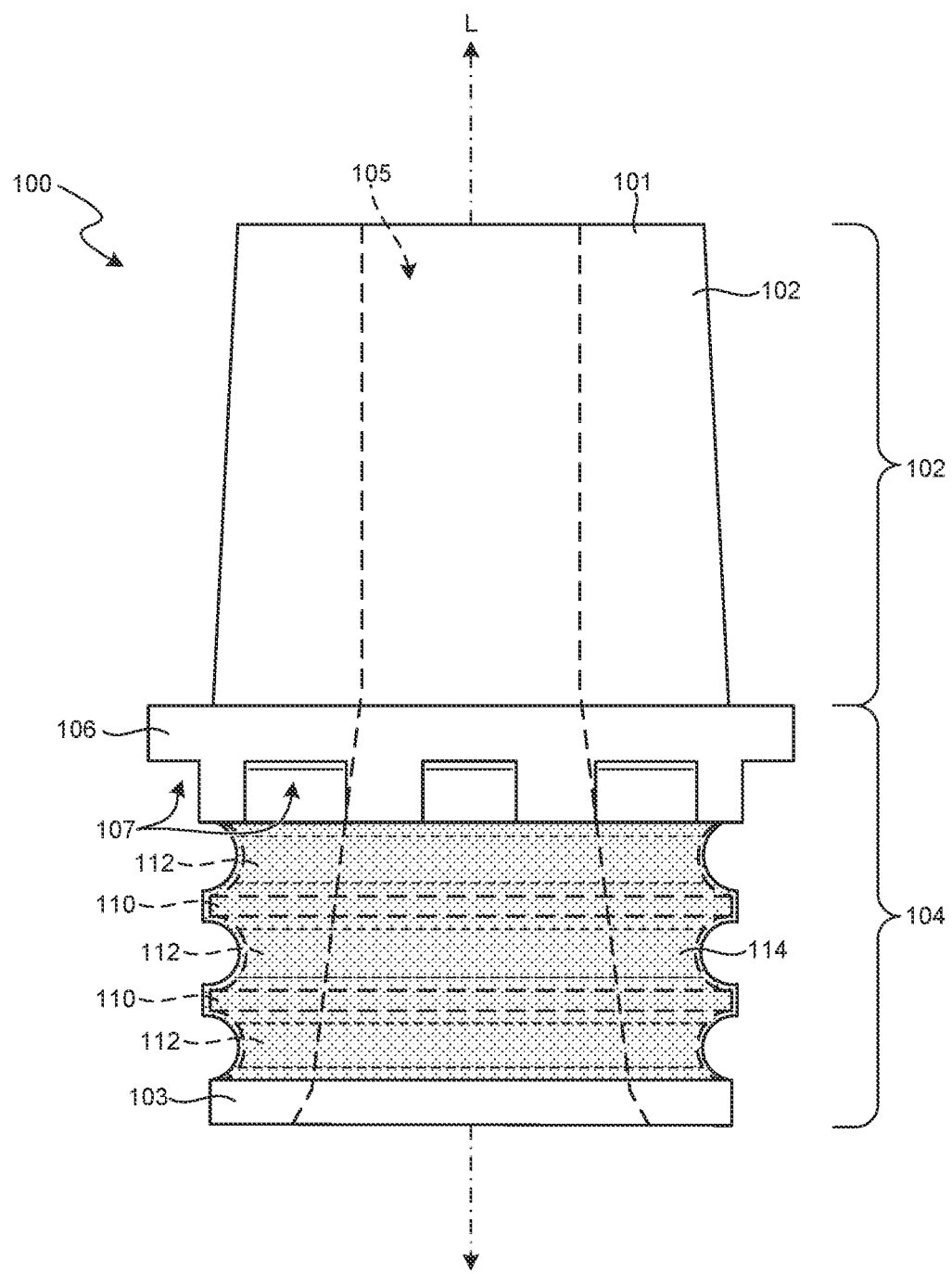
FIG. 1 is a side view of a battery part at least partially coated with a sealant configured in accordance with an embodiment of the present technology.

FIG. 1 is a side view of a battery part 100 configured in accordance with an embodiment of the present technology. In the illustrated embodiment, the battery part 100 comprises a battery terminal or terminal bushing. The battery part 100 can be formed from lead, lead alloy, and/or other suitable materials by forming (e.g., cold-forming, cold-forming with a segmented mold, hot-forming, roll-forming, stamping, etc.), casting (e.g., die casting), forging, machining, and/or other suitable methods known in the art. In the illustrated embodiment, the battery part 100 includes a body having a projecting portion or lug portion 102 that extends from a base portion 104. The lug portion 104 can be any portion of the battery part 100 configured to be connected to an external electrical connector such as, for example, a post, a flange, a projection including one or more holes, etc. The battery part 100 can also include a passage or through-hole 105 extending through the battery part 100 from a first end portion 101 to a second end portion 103 of the battery part 100. In the illustrated embodiment, the battery part 100 is generally cylindrical and rotatably symmetric, and the through-hole 105 is aligned with a longitudinal axis L of the battery part 100. In other embodiments, the battery part 100 can have other (e.g., asymmetric) shapes.

In some embodiments, the battery part 100 can include a circumferential flange 106 at an approximate midpoint of the battery part 100 between the lug portion 102 and the base portion 104. In the illustrated embodiment, the flange 106 projects radially outward beyond the base portion 104 and extends circumferentially around the battery part 100. In some embodiments, the flange 106 can have a generally circular shape while, in other embodiments, the flange 106 can have a polygonal or other shape. In the illustrated embodiment, the flange 106 includes a plurality of recesses or grooves 107 extending at least partially through the flange 106. In some embodiments, the grooves 107 can have an upside down U-shaped configuration in which the grooves open in a direction away from the lug portion 102 and toward the base portion 104. In other embodiments, the grooves 107 can be omitted, or the flange 106 can have a different arrangement of grooves. For example, the flange 106 can include a different number of grooves and/or the grooves can open in a direction toward the lug portion 102. In some embodiments, the flange 106 is configured to engage or otherwise grip battery container material (shown in FIG. 2) that is molded around the flange 106 to inhibit the battery part 100 from twisting or otherwise moving in the battery container.

an exterior surface (e.g., an outward-facing surface) (e.g., in a direction away from the through-hole 105), and a plurality of recessed portions or grooves 112 formed therebetween.

In the illustrated embodiment, the base portion 104 includes a plurality of circumferential acid rings or sealing portions 110 that extend generally radially outward/away from the longitudinal axis L of the battery part 100, and a plurality of recessed portions or grooves 112 formed therebetween. The battery part 100 can include more or fewer than two sealing portions 110 in other embodiments. In the illustrated embodiment, the sealing portions 110 have a generally rectangular cross-sectional shape. In other embodiments, the sealing portions 110 can have a generally round, circular, or other cross-sectional shape or profile, and/or the sealing portions 110 can have different shapes from one another. As described in detail below, a battery container (shown in FIG. 2) can be formed around the sealing portions 110. The profile of the sealing portions 110 forms a labyrinth or tortuous path that inhibits fluids from leaking from the battery container between the battery part 100 and the container during formation and in use.

The battery part 100 is provided by way of example only, and as those of ordinary skill in the art will appreciate, in other embodiments, battery parts configured in accordance with the present disclosure can have other suitable configurations and shapes including, for example, more or fewer flanges (e.g., torque flanges) and/or more fewer sealing portions having other shapes, arrangements, etc. For example, the battery part 100 can include one or more features that are generally similar to the features of the battery parts disclosed in (i) U.S. Pat. No. 9,190,654, titled "BATTERY PARTS AND ASSOCIATED SYSTEMS AND METHODS," filed Mar. 25, 2014; (ii) U.S. Pat. No. 9,935,306, titled "BATTERY PARTS HAVING RETAINING AND SEALING FEATURES AND ASSOCIATED METHODS OF MANUFACTURE AND USE," filed Jul. 7, 2014; and/or (iii) U.S. Pat. No. 9,748,551, titled "BATTERY PARTS HAVING RETAINING AND SEALING FEATURES AND ASSOCIATED METHODS OF MANUFACTURE AND USE," filed Jun. 29, 2012, each of which is incorporated herein by reference in its entirety.

In another aspect of the illustrated embodiment, the battery part 100 includes a coating or sealant 114 that is formed over at least a portion of an exterior surface (e.g., an outward-facing surface) of the base portion 104. In some embodiments, the sealant 114 has a generally uniform thickness of from about 1 mm to about 2 mm (e.g., from 1.5 mm to about 2 mm). In other embodiments, the sealant 114 can have a different or varying thickness. As described in detail below with reference to FIG. 2, the sealant 114 is configured to provide a seal or barrier at the interface between the battery part 100 and battery container material to inhibit fluids and gases from moving into or out off the battery container between the battery part 100 and the container during formation and in use.

The sealant 114 can be a solventless compound that is resistant to corrosion by electrolytes (e.g., sulfuric acid) or other battery fluids. That is, the sealant 114 can be applied to the battery part 100 and cured without the use of (e.g., evaporation of) a solvent, such as trichloroethylene (TCE). In some embodiments, for example, the sealant 114 is a light-curable material such as a resin or organic compound. More particularly, the sealant 114 can be a light-curable resin that includes acrylated urethanes (e.g., a light-curable acrylated urethane resin). In some embodiments, the sealant 114 is curable via exposure to broad spectrum ultraviolet (UV) light, narrow spectrum UV light (e.g., LED light), visible light, and/or light having other suitable wavelengths. In certain embodiments, the sealant 114 can be a light-curable maskant or masking resin manufactured by Dymax Corporation, of Torrington, Connecticut, such as the light-curable maskants manufactured under the trademark "SpeedMask." In some embodiments, the sealant 114 (identified as "Cured Material" in the chemical equation below) can be formed and cured according to the following chemical equation:

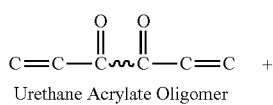
Urethane Acrylate Oligomer

-continued $$\underset{\text{Acrylate Monomer}}{C=C-\overset{O}{\overset{\|}{C}}-R-\overset{O}{\overset{\|}{C}}-C=C} + \text{Photoinitiator} \xrightarrow{\text{UV Light}} \text{Cured Material}$$

Notably, because the sealant 114 need not be dissolved in a solvent before application, the sealant 114 can be non-toxic, non-flammable, and can have no negative or environmental impacts.

Figure 2:
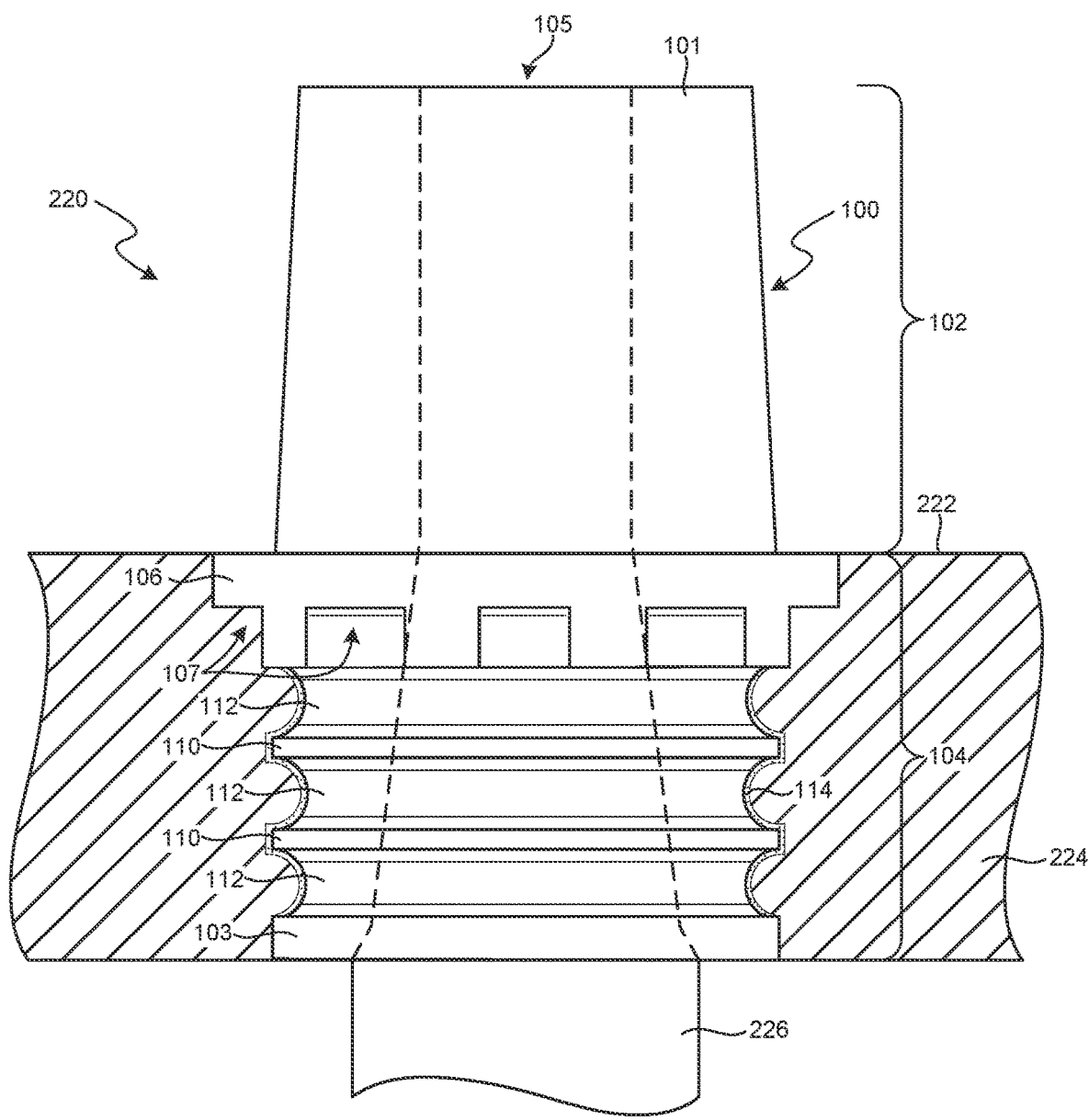
FIG. 2 is a side view of a battery assembly including the battery part of FIG. 1 configured in accordance with an embodiment of the present technology.

FIG. 2 is a partial cross-sectional view of a battery assembly 220 including the battery part 100 of FIG. 1 attached to a battery casing or container 222 in accordance with an embodiment of the present technology. In the illustrated embodiment, the battery assembly 220 is attached to the battery container 222 so that the lug portion 102 is exposed and accessible. The battery container 222 and the sealant 114 of the battery part 100 are shown in cross-section in FIG. 2 for the sake of clarity. The battery container 222 can be formed from a moldable material 224, such as polypropylene, polyethylene, other plastics, thermoplastic resins, and/or other suitable materials known in the art. During manufacture of the battery assembly 220, the material 224 can be flowed in a molten form into a mold (not shown) supporting the base portion 104 of the battery part 100 so that the sealing portions 110 are embedded within the material 224. The shape of the sealing portions 110 form a labyrinth or tortuous path that prevents or at least inhibits fluids (e.g., electrolyte, acid, water, etc.) from escaping the battery container 222. In some embodiments, as shown in FIG. 2, the material 224 can also be flowed around the flange 106 so that the flange 106 is at least partially embedded in the material 224. The battery assembly 220 can also include a lead anode or conductor 226 that is mechanically and electrically connected to the battery part 100. More specifically, the conductor 226 fills the through-hole 105 and can be connected to a battery grid (not shown) positioned within the battery container 222, as is known in the art.

Referring to FIGS. 1 and 2 together, the sealant 114 is configured to seal the interface between the battery container 222 and the battery part 100 to inhibit an electrolyte (e.g., sulfuric acid) from leaking from the battery container 222 and to inhibit the ingress of oxygen, or other gases into the battery container 222, which can diminish the capacity of the battery. In particular, the sealant 114 is configured to seal the interface even as the battery part 100 and the material 224 tend to pull away from each other, for example, as a result of the differing coefficients of thermal expansion of these components and thermal cycling during use of the battery assembly 220. In some embodiments, the sealant 114 is formed only over the exterior surfaces of the sealing portions 110 and the grooves 112. In other embodiments, the sealant 114 can be formed over all or a different portion of the base portion 104, the flange 106, and/or other portions of the battery part 100 that may interface with the material 224 of the battery container 222. For example, the sealant 114 can be formed over the entire exterior surface of the base portion 104 (e.g., over the second end portion 103, the sealing portions 110, and the grooves 112) and/or the flange 106 (e.g., including in the grooves 107). As shown, the sealant 114 need not be formed over the exterior surface of the lug portion 102 which projects from the battery container 222 and therefore does not interface with the container material 224.

The sealant 114 can be formed on or applied to the battery part 100 using a variety of suitable methods. For example, the sealant 114 can be sprayed or brushed onto the battery part 100, and/or the battery part 100 can be dipped and/or rolled in the sealant 114. Moreover, the sealant 114 can be applied in a single coat or in multiple coats (e.g., by dipping, rolling, spraying, and/or bushing the sealant 114 onto the battery part 100 multiple times). In some embodiments, the battery part 100 is rotated after or during application of the sealant 114 to achieve a desired (e.g., uniform) thickness of the coating of the sealant 114. Accordingly, the sealant 114 can be selected to have a desired viscosity to facilitate application via a chosen method (e.g., dipping, spraying, painting, etc.). After applying the sealant 114 to the battery part 100, the sealant 114 is cured by exposing the sealant 114 to light. As described above, the sealant 114 can be cured via exposure to narrow spectrum UV light, broad spectrum UV light, visible light, and/or light of other wavelengths. In some embodiments, the battery part 100 can be rotated relative to a suitable light source to cure the sealant 114 thereon. In other embodiments, the battery part 100 can be exposed to multiple light sources, or a light source can be moved relative to the battery part 100 to facilitate curing without rotation or other movement of the battery part 100. In some embodiments, the sealant 114 is configured to cure rapidly from exposure to light of a suitable wavelength. In some embodiments, for example, curing can take between about 1-60 seconds.

In some embodiments, because the sealant 114 is light-curable and can be applied without evaporating a hazardous solvent, the devices/systems for applying and curing the sealant 114 need not be positioned within a controlled air environment (e.g., within a ventilated enclosure). As such, the devices/systems for applying and curing the sealant 114 can be placed nearby to the devices/systems for manufacturing the battery part 100. Accordingly, the present technology can reduce the cost, complexity, and/or time required to manufacture a battery part as compared to, for example, conventional manufacturing techniques that utilize a solvent (e.g., trichloroethylene) to apply and cure a sealing compound.

Figure 3:
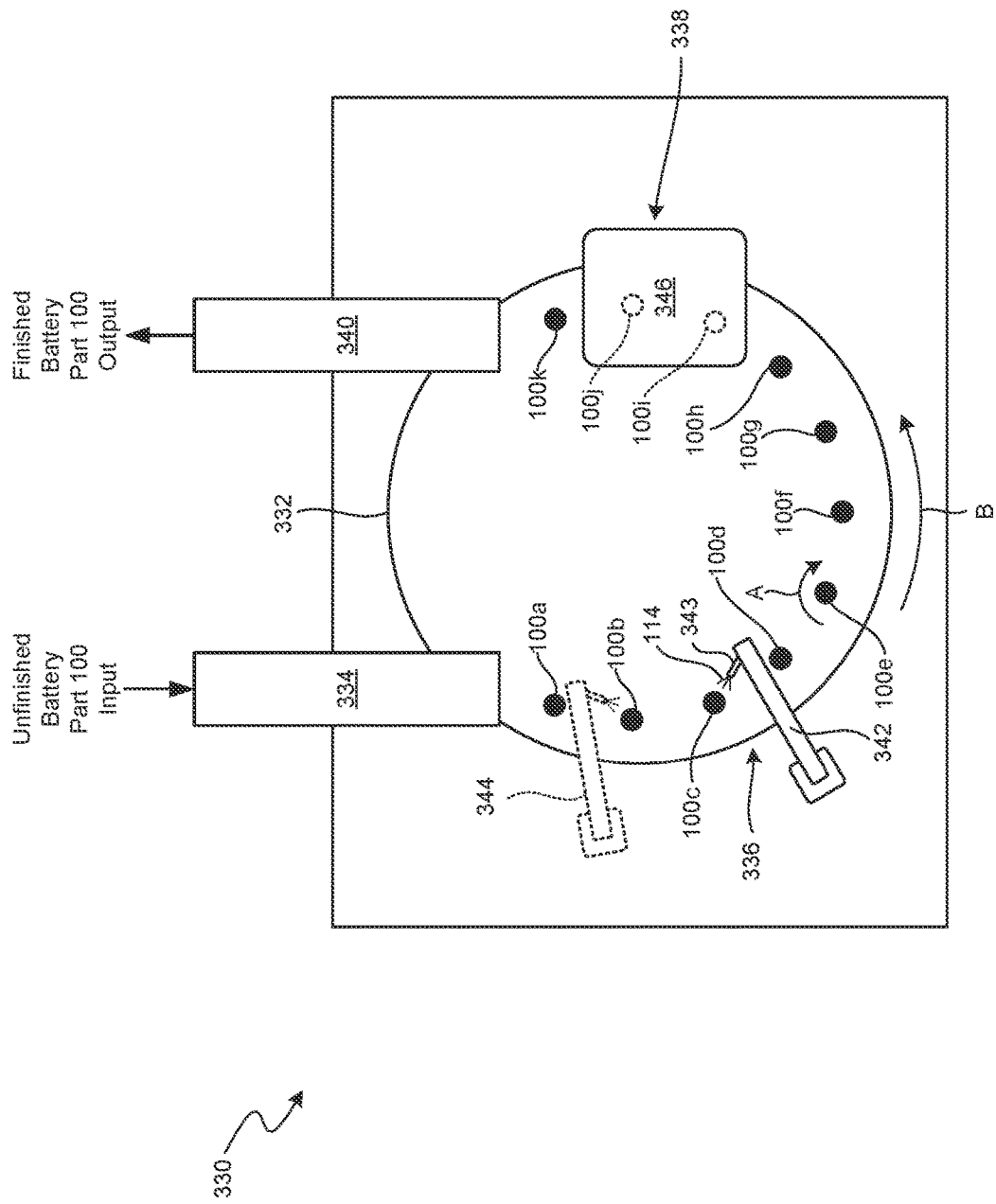
FIG. 3 is a partially schematic top-view of a battery part sealant application system configured in accordance with an embodiment of the present technology.

FIG. 3 is a partially schematic top-view of a battery part sealant application system 330 ("system 330") configured in accordance with an embodiment of the present technology. The system 330 can operate to apply and cure the sealant 114 on a plurality of the battery parts 100 (identified individually as battery parts 100a-100k). In the illustrated embodiment, the system 330 includes a rotatable support or platform 332 configured to receive a plurality of the battery parts 100 via a loading mechanism 334. The loading mechanism 334 can include a vibratory hopper and/or accumulator/orientation loading station that is configured to receive unfished battery parts 100 and suitably orient/arrange the battery parts 100 for presentation and mounting on the rotatable platform 332. In other embodiments, the loading mechanism 334 can include a robotic arm or gripper for moving the battery parts 100 onto the rotatable platform 332. In other embodiments, the loading mechanism 334 can be omitted and the unfinished battery parts 100 can be manually loaded onto the rotatable platform 332.

The rotatable platform 332 can include a plurality of recesses and/or fixtures (not pictured) configured to releasably grasp and secure individual ones of the battery parts 100 so that the base portion 104 is exposed. In some embodiments, the fixtures can include spindles that are rotatable (e.g., as indicated by the arrow A) to individually rotate the corresponding ones of the battery parts 100. The rotatable platform 332 can be rotated or indexed (e.g., as indicated by the arrow B) to move the battery parts 100 sequentially through a sealant application station 336, a curing station 338, and to an output mechanism 340.

The sealant application station 336 includes a sealant applicator or dispenser 342 for coating (e.g., spraying) the sealant 114 on some or all of the base portion 104 of a corresponding one of the battery parts 100 (e.g., the battery part 100c in FIG. 3) that is positioned at the sealant application station 336. In the illustrated embodiment, the sealant dispenser 342 is a pressurized sprayer having at least one spray nozzle 343 for directing the sealant 114 toward the battery part 100c that is positioned at the sealant application station 336. In some embodiments, the nozzle 343 is configured to remain stationary while the battery part 100c is rotated (e.g., on a corresponding spindle) at the sealant application station 336. In other embodiments, the sealant dispenser 342 is actuatable in at least one direction (e.g., in the X-, Y-, and Z-planes) such that the nozzle 343 is movable relative to the battery part 100 to suitably apply the sealant 114 to the battery part 100 without rotation or with minimal rotation of the battery part 100. For example, the sealant dispenser 342 can be electromechanically actuated to vary the position of the nozzle 343. In some embodiments, the motion of the nozzle 343 can be synchronized with the specific geometry of the battery part 100c and/or the rotation speed of the battery part 100c can be varied to provide a desired pattern and/or thickness of the coating of the sealant 114. The system 330 can further include one or more additional sealant dispensers (e.g., a sealant dispenser 344 shown schematically in FIG. 3) that are configured to coat the battery parts 100 with the sealant 114 (e.g., with another coat of the sealant 114) or a different material. Although the sealant dispenser 342 is depicted a pressured sprayer in FIG. 3, the sealant dispenser can include any suitable structure for applying the sealant 114 to the battery parts 100. For example, the sealant dispenser 342 can include one or more brushes, a dipping station, etc.

A light source 346 is positioned at the curing station 338 and is configured to irradiate the battery parts 100 to cure the sealant 114 thereon. In some embodiments, the light source 346 includes one or more UV light sources positioned within a tunnel or hood that focuses the light on the battery parts 100 positioned within the tunnel (e.g., the battery parts 100i, j in FIG. 3). The battery parts 100 can be rotated while positioned at the curing station 338 or can remain stationary. In some embodiments, the battery parts 100 are rotated at lower speed while positioned at the curing station 338 than when positioned at the sealant application station 336 from the platform 332. The output mechanism 340 can include a hopper, bin, chute, conveyer, etc., that is configured to receive the finished, cured battery parts 100. In some embodiments, the output mechanism can further include a robotic arm configured to pick and place the finished battery parts 100—for example, to position the battery parts 100 on pallets.

Some or all of the operation of the system 330 can be controlled by an automated system controller. The system controller can include a processor (e.g., a programmable logic controller (PLC)) and a memory (e.g., a computer readable media) configured to store computer-readable instructions. The processor can be configured to execute the instructions to provide operating instructions and/or commands to the various components of the system 330 and/or to receive information therefrom as described in detail above.

Several aspects of the present technology are set forth in the following examples:
1. A battery part, comprising:
    a body having a lug portion extending from a base portion, wherein the base portion is configured to be at least partially embedded in battery container material; and
    a light-curable material applied to at least a portion of an exterior surface of the base portion, wherein the light-curable material is configured to seal an interface between the battery part and the battery container material when the base portion is embedded in the battery container material.
2. The battery part of example 1 wherein the base portion includes a plurality of sealing portions extending radially outward relative to a longitudinal axis of the battery part, and wherein the light-curable material is applied directly to an exterior surface of the sealing portions.
3. The battery part of example 1 or 2 wherein the light-curable material includes an acrylated urethane.
4. The battery part of any one of examples 1-3 wherein the light-curable material is a masking resin that is curable via exposure to UV light.
5. The battery part of any one of examples 1-4 wherein the light-curable material is a solventless compound that is resistant to corrosion by electrolytes.
6. The battery part of any one of examples 1-5 wherein the light-curable material is omitted from an exterior surface of the lug portion.
7. The battery part of any one of examples 1-6 wherein the body further includes a circumferential flange projecting radially outward beyond the base portion, wherein the flange is configured to be at least partially embedded in the battery container material to inhibit the battery part from twisting in the battery container material, and wherein the light-curable material is applied to at least a portion of an exterior surface of the flange.
8. A method of manufacturing a battery part including a body having a lug portion and a base portion, the method comprising:
    applying a sealant to at least a portion of an exterior surface of the base portion; and
    exposing the sealant to light to cure the sealant, wherein the cured sealant is configured to seal an interface between the battery part and battery container material when the base portion is embedded in the battery container material.
9. The method of example 8 wherein applying the sealant includes applying a sealant that has not been dissolved in a solvent prior to applying the sealant to the base portion.
10. The method of example 8 or 9 wherein applying the sealant includes applying a masking resin including an acrylated urethane, and wherein exposing the sealant to light includes irradiating the sealant with ultraviolet light.
11. The method of any one of examples 8-10, further comprising embedding the base portion of the battery part in the battery container material.
12. The method of any one of examples 8-11 wherein the body of the battery part includes a plurality of sealing portions extending radially outward relative to a longitudinal axis of the battery part, and wherein applying the sealant includes applying the sealant to an exterior surface of the sealing portions.

13. The method of any one of examples 8-12 wherein applying the sealant to the exterior surface of the sealing portions includes applying the sealant to have a generally uniform thickness.

14. The method of any one of examples 8-13, further comprising rotating the battery part while applying the sealant and exposing the sealant to light.

15. A battery part manufacturing system, comprising:
a support configured to receive a battery part;
a sealant applicator configured to coat at least a portion of the battery part with a sealant; and
a light source configured to irradiate the sealant on the battery part to cure the sealant on the battery part.

16. The battery part manufacturing system of example 15 wherein the platform is movable to sequentially move the battery part past the sealant applicator and the light source.

17. The battery part manufacturing system of example 15 or 16 wherein the platform includes a spindle configured to releasably grasp the battery part, and wherein the spindle is rotatable to rotate the battery part relative to the sealant applicator and the light source.

18. The battery part manufacturing system of any one examples 15-17 wherein the spindle is configured to rotate the battery part at a first speed when the battery part is positioned near the sealant applicator and to rotate the battery part at a second speed, less than the first speed, when the battery part is positioned near the light source.

19. The battery part manufacturing system of any one examples 15-18 wherein the sealant applicator includes a pressurized sprayer having a spray nozzle for directing the sealant toward the battery part.

20. The battery part manufacturing system of any one examples 15-19 wherein the sealant applicator is electromechanically actuatable to vary the position of the spray nozzle relative to the battery part.

From the foregoing, it will be appreciated that specific embodiments have been described herein for purposes of illustration, but that various modifications may be made without deviating from the spirit and scope of the present technology. For example, in particular embodiments, details of the disclosed battery parts or battery part manufacturing systems may be different than those shown in the foregoing Figures. For example, a battery part manufacturing system may have other suitable arrangements, such as including one or more conveyors for moving the battery parts through a plurality of stations in addition to or alternatively to including one or more or rotatable platforms. Likewise, a battery part manufacturing system may include only a sealant application station or a curing station, or may include additional stations, such as a conformal coating station, a centrifugal spin station, etc. Likewise, a light-curable sealant can be applied to the battery parts of the present technology in a myriad of different manners—via rolling, dipping, painting, etc.—in addition to or alternatively to spraying the sealant on the battery parts.

Accordingly, those skilled in the art will recognize that numerous modifications or alterations can be made to the components or systems disclosed herein. Moreover, certain aspects of the present technology described in the context of particular embodiments may be combined or eliminated in other embodiments. Further, while advantages associated with certain embodiments have been described in the context of those embodiments, other embodiments may also exhibit such advantages, and not all embodiments need necessarily exhibit such advantages to fall within the scope of the present technology. Accordingly, the inventions are not limited except as by the appended claims.

We claim:

1. A battery assembly, comprising:
a battery container formed from battery container material, wherein the battery container is configured to hold an electrolyte;
a battery part including a portion at least partially embedded in the battery container material; and
a light-cured material applied to and cured on the portion of the battery part before the portion of the battery part is embedded in the battery container material, wherein the light-cured material is configured to seal an interface between the portion of the battery part and the battery container material.

2. The battery assembly of claim 1 wherein the light-cured material is a solventless compound.

3. The battery assembly of claim 2 wherein the solventless compound is resistant to corrosion by the electrolyte.

4. The battery assembly of claim 1 wherein the light-cured material is a masking resin that is cured via exposure to ultraviolet light.

5. The battery assembly of claim 1 wherein the light-cured material is a masking resin.

6. The battery assembly of claim 1 wherein the light-cured material has a generally uniform thickness on the portion of the battery part.

7. The battery assembly of claim 1 wherein the battery container is configured to be formed with the battery container material in molten form, wherein the portion of the battery part is at least partially embedded in the battery container material in molten form, and wherein the battery container material in molten form is configured to be cured to a solid state to form the battery container.

8. The battery assembly of claim 1 wherein the portion of the battery part includes a plurality of sealing portions extending radially outward relative to a longitudinal axis of the battery part, and wherein the light-cured material is applied to and cured on the sealing portions.

9. The battery assembly of claim 8 wherein the sealing portions have a generally rectangular cross-sectional shape.

10. The battery assembly of claim 8 wherein the light-cured material has a generally uniform thickness along an exterior surface of the sealing portions.

11. The battery assembly of claim 1 wherein the battery part further includes a circumferential flange projecting radially outward beyond the portion of the battery part, wherein the flange is configured to be at least partially embedded in the battery container material to inhibit the battery part from twisting relative to the battery container, and wherein the light-cured material omitted from an exterior surface of the flange.

12. A method of forming a battery assembly, the method comprising:
at least partially embedding a portion of a battery part in battery container material, wherein the portion of the battery part has a light-cured material applied to and cured thereon before the portion of the battery part is at least partially embedded in the battery container material.

13. The method of claim 12 wherein at least partially embedding the portion of the battery part in the battery container material comprises at least partially embedding the portion of the battery part in the battery container material with the battery container material in molten form.

14. The method of claim 13 wherein the method further comprises curing the battery container material in molten form to a solid state to form a battery container with the portion of the battery part at least partially embedded therein.

15. The method of claim 14 wherein the light-cured material is configured to seal an interface between the portion of the battery part and the battery container.

16. The method of claim 12 wherein the light-cured material is a solventless compound that is resistant to corrosion by electrolytes.

17. The method of claim 12 wherein the light-cured material is a masking resin that is cured via exposure to ultraviolet light.

18. The method of claim 12 wherein the light-cured material has a generally uniform thickness along the portion of the battery part.

19. The method of claim 12 wherein the portion of the battery part includes a plurality of sealing portions extending radially outward relative to a longitudinal axis of the battery part, and wherein the light-cured material is applied to and cured on the sealing portions.

20. The method of claim 19 wherein the light-cured material has a generally uniform thickness along an exterior surface of the sealing portions.

\* \* \* \* \*